United States Patent
Suzuki

(10) Patent No.: US 12,149,822 B2
(45) Date of Patent: Nov. 19, 2024

(54) IMAGING APPARATUS, METHOD FOR CONTROLLING IMAGING APPARATUS, AND STORAGE MEDIUM

(71) Applicant: CANON KABUSHIKI KAISHA, Tokyo (JP)

(72) Inventor: Yutaka Suzuki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/349,331

(22) Filed: Jun. 16, 2021

(65) Prior Publication Data
US 2021/0400196 A1 Dec. 23, 2021

(30) Foreign Application Priority Data
Jun. 22, 2020 (JP) .................................. 2020-107018

(51) Int. Cl.
| | |
|---|---|
| H04N 23/66 | (2023.01) |
| H04N 23/667 | (2023.01) |
| H04N 23/69 | (2023.01) |
| H04N 23/695 | (2023.01) |

(52) U.S. Cl.
CPC ........... *H04N 23/667* (2023.01); *H04N 23/66* (2023.01); *H04N 23/69* (2023.01); *H04N 23/695* (2023.01)

(58) Field of Classification Search
USPC ........................................................ 348/169
See application file for complete search history.

(56) References Cited

U.S. PATENT DOCUMENTS

| | | | | |
|---|---|---|---|---|
| 7,839,926 B1* | 11/2010 | Metzger | ................. | H04N 7/181 375/240.26 |
| 10,147,191 B1* | 12/2018 | Ribeiro | ............ | H04N 5/232935 |
| 10,931,889 B1* | 2/2021 | Barone | ................ | H04N 5/2251 |
| 2007/0035623 A1* | 2/2007 | Garoutte | ............ | H04N 5/23232 348/E7.086 |
| 2007/0061862 A1* | 3/2007 | Berger | ................... | H04N 7/163 725/62 |
| 2007/0110305 A1* | 5/2007 | Corcoran | ................ | G06T 5/001 382/167 |

(Continued)

FOREIGN PATENT DOCUMENTS

| | | |
|---|---|---|
| JP | 2006229322 A | 8/2006 |
| JP | 2011030040 A | 2/2011 |

(Continued)

*Primary Examiner* — Nigar Chowdhury
(74) *Attorney, Agent, or Firm* — Canon U.S.A., Inc., IP Division

(57) ABSTRACT

An imaging apparatus configured to transmit a captured image to an external apparatus, includes a computer executing instructions that, when executed by the computer, cause the computer to function as a detection unit configured to detect a subject from the captured image, and a control unit configured to switch between a first mode of controlling at least one of a pan operation, a tilt operation, and a zoom operation to track the subject detected by the detection unit, and a second mode of controlling at least one of the pan operation, the tilt operation, and the zoom operation by a user operation from the external apparatus, wherein the control unit performs control to switch the second mode to the first mode in a case where the subject is included in a predetermined region in the captured image while the imaging apparatus is operating in the second mode.

16 Claims, 8 Drawing Sheets

(56) References Cited

U.S. PATENT DOCUMENTS

| | | | | |
|---|---|---|---|---|
| 2008/0144864 A1* | 6/2008 | Huon | | H04R 5/02 |
| | | | | 381/305 |
| 2008/0177994 A1* | 7/2008 | Mayer | | G06F 16/00 |
| | | | | 709/224 |
| 2009/0290023 A1* | 11/2009 | Lefort | | G08B 13/1963 |
| | | | | 348/151 |
| 2010/0245532 A1* | 9/2010 | Kurtz | | G06V 20/40 |
| | | | | 348/14.03 |
| 2012/0062769 A1* | 3/2012 | Kinoshita | | H04N 5/23219 |
| | | | | 348/E5.045 |
| 2012/0289140 A1* | 11/2012 | Marx | | B60H 1/28 |
| | | | | 454/162 |
| 2015/0103185 A1* | 4/2015 | Sasaki | | H04N 17/002 |
| | | | | 348/169 |
| 2015/0244928 A1* | 8/2015 | Jo | | H04N 5/23206 |
| | | | | 348/211.4 |
| 2016/0336041 A1* | 11/2016 | Mukai | | H04N 5/77 |
| 2017/0163899 A1* | 6/2017 | Irie | | H04N 23/632 |
| 2017/0272660 A1* | 9/2017 | Ishihara | | G06T 11/60 |
| 2018/0139374 A1* | 5/2018 | Yu | | H04N 21/21805 |
| 2018/0376074 A1* | 12/2018 | Gumpert | | G06T 7/292 |
| 2019/0306408 A1* | 10/2019 | Hofer | | H04N 7/181 |
| 2020/0059595 A1* | 2/2020 | Ono | | B64C 39/024 |
| 2020/0342613 A1* | 10/2020 | Altuev | | H04N 17/002 |
| 2020/0412947 A1* | 12/2020 | Fang | | H04N 5/23299 |

FOREIGN PATENT DOCUMENTS

| | | |
|---|---|---|
| JP | 2012033982 A | 2/2012 |
| JP | 2012243161 A | 12/2012 |
| JP | 2016100636 A | 5/2016 |
| JP | 2017216675 A | 12/2017 |
| JP | 2019083585 A | 5/2019 |

* cited by examiner

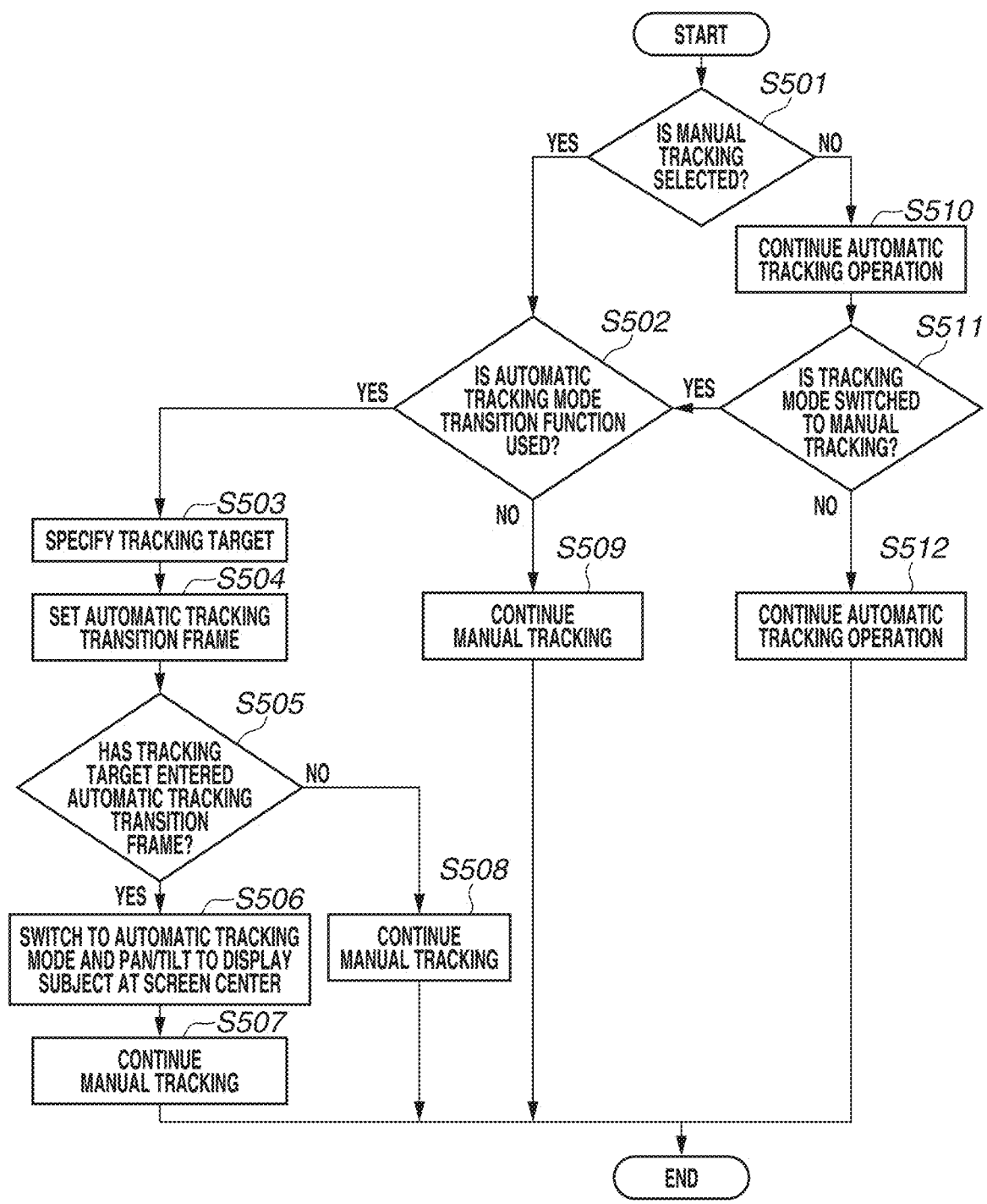

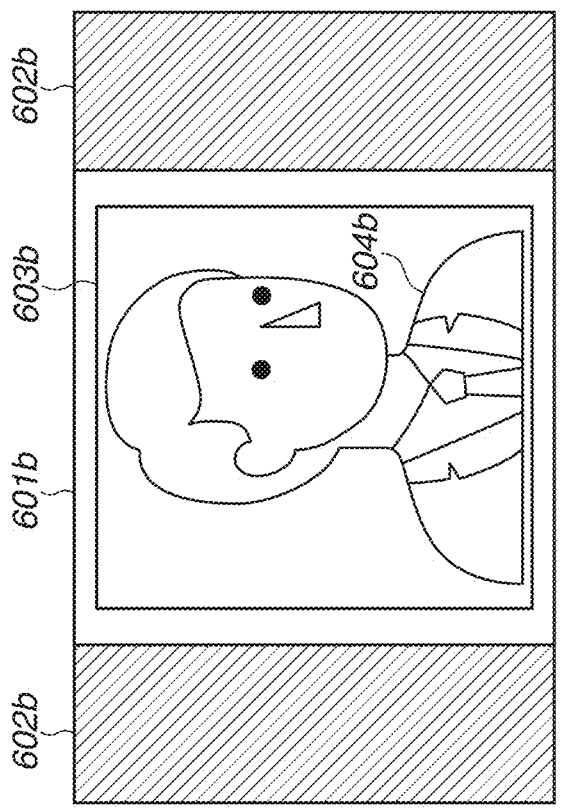
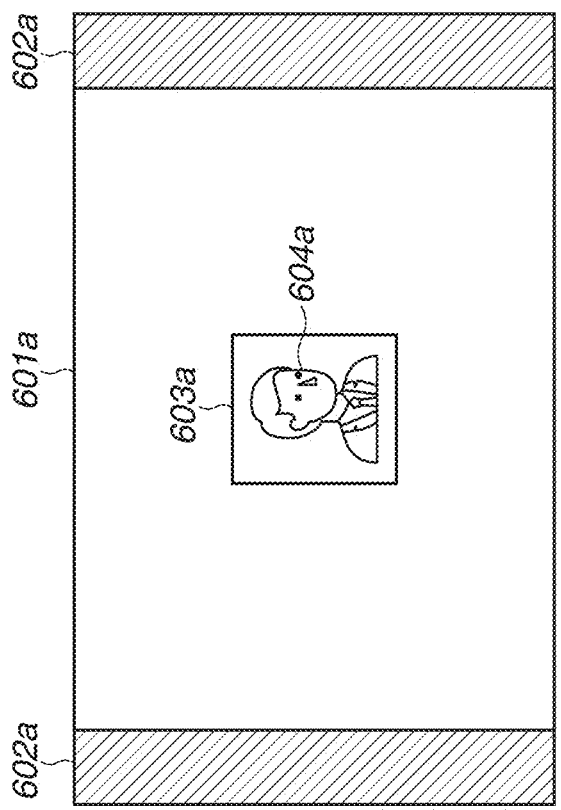

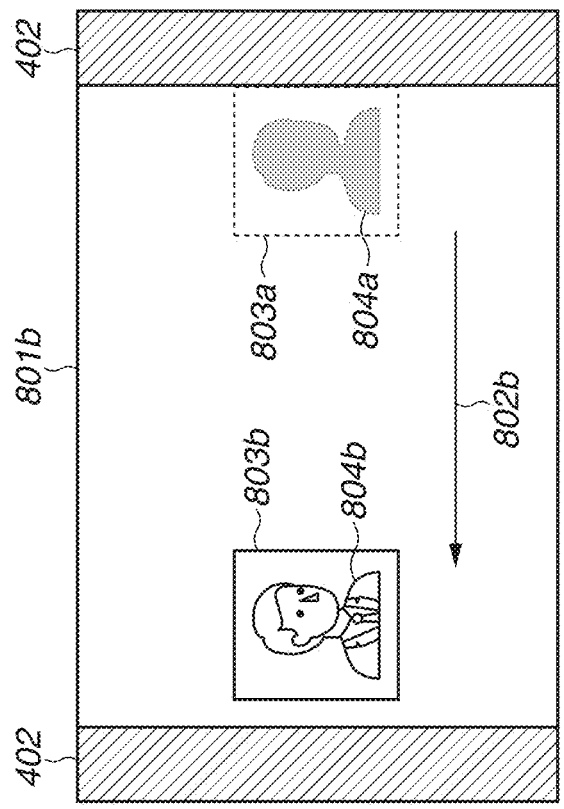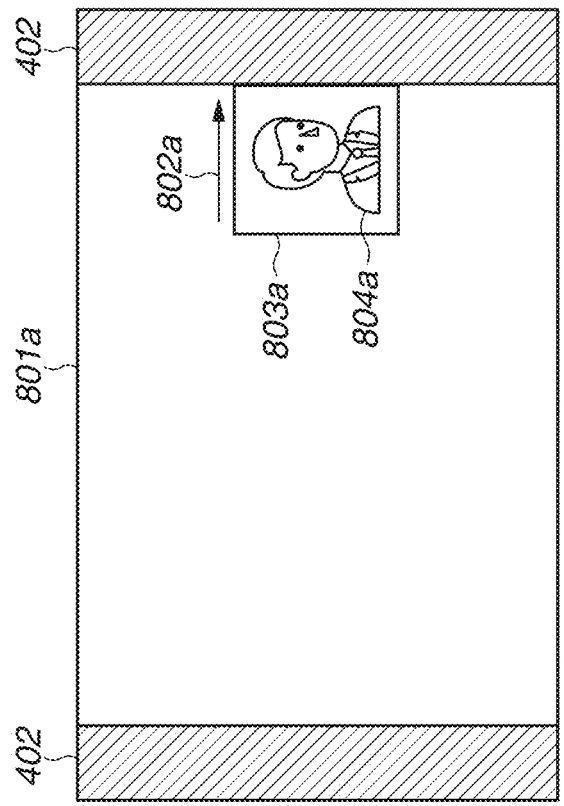

IMAGING APPARATUS, METHOD FOR CONTROLLING IMAGING APPARATUS, AND STORAGE MEDIUM

BACKGROUND

Field

The present disclosure relates to an imaging apparatus, a method for controlling an imaging apparatus, and a storage medium for an imaging apparatus.

Description of the Related Art

An increase in the speed of the Internet has allowed distribution of video images using networks, and has promoted widespread use of a camera where an imaging direction can be changed by remote control. A user controls the imaging direction thereof using, for example, an operation panel in a screen to operate the camera in a pan (horizontal) direction and a tilt (vertical) direction while viewing the screen displaying a captured image thereon. It is also known to have a camera with an automatic tracking function of automatically controlling the imaging direction in such a manner that a moving object detected in the captured image appears within the screen. Japanese Patent Application Laid-Open No. 2019-83585 discusses that automatic tracking is stopped if a moving object is in a predetermined region set in a screen when the detected moving object is automatically tracked. Japanese Patent Application Laid-Open No. 2017-216675 discusses that a subject targeted for tracking is estimated and the tracking is switched to automatic tracking when the subject is imaged while being tracked with a manual operation.

There is a case where a user captures an image while tracking an intended subject by manually operating an external apparatus. In this case, the subject targeted for the tracking can move out of the screen of the external apparatus due to, for example, an excessive operation.

SUMMARY

According to an aspect of the present disclosure, an imaging apparatus configured to transmit a captured image to an external apparatus includes a computer executing instructions that, when executed by the computer, cause the computer to function as a detection unit configured to detect a subject from the captured image, and a control unit configured to switch between a first mode of controlling at least one of a pan operation, a tilt operation, and a zoom operation to track the subject detected by the detection unit, and a second mode of controlling at least one of the pan operation, the tilt operation, and the zoom operation by a user operation from the external apparatus, wherein the control unit performs control to switch the second mode to the first mode in a case where the subject is included in a predetermined region in the captured image while the imaging apparatus is operating in the second mode.

Further features of the present disclosure will become apparent from the following description of exemplary embodiments with reference to the attached drawings.

BRIEF DESCRIPTION OF THE DRAWINGS

FIG. 5 is a flowchart illustrating tracking control processing.

FIGS. 6A and 6B each illustrate an example of a screen according to a second exemplary embodiment.

FIGS. 8A and 8B each illustrate an example of a screen according to a third exemplary embodiment.

DESCRIPTION OF THE EMBODIMENTS

A first exemplary embodiment of the present disclosure will be described below with reference to the attached drawings.

(Overall Configuration of Imaging System)

Figure 1:
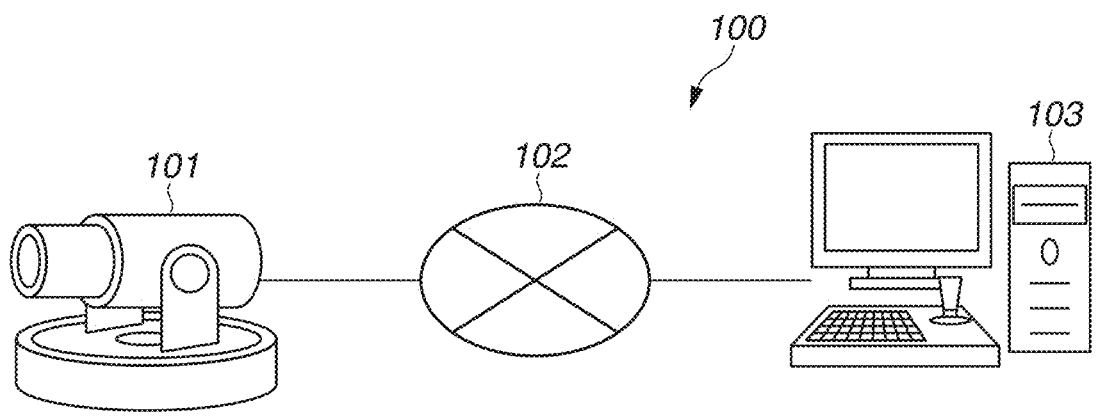
FIG. 1 illustrates an example of an overall configuration of an imaging system.

First, an example of an overall configuration of an imaging system 100 will be described with reference to FIG. 1. The imaging system 100 includes an imaging apparatus 101, which can perform a pan (horizontal) operation, a tilt (vertical) operation, and a zoom operation, and an external apparatus 103, which displays a captured image and various kinds of information provided from the imaging apparatus 101. The imaging apparatus 101 and the external apparatus 103 are communicable with each other via a network 102. The imaging system 100 illustrated in FIG. 1 is configured to include one imaging apparatus 101 and one external apparatus 103, but the numbers of them are not limited in particular.

The imaging apparatus 101 can transmit the captured image to the external apparatus 103. The imaging apparatus 101 performs the pan operation, the tilt operation, and the zoom operation by being remotely operated from the external apparatus 103. In other words, a user of the external apparatus 103 can capture an image in a desired imaging direction and with a desired angle of view while viewing the captured image displayed on the external apparatus 103. The network 102 is, for example, an Internet Protocol (IP) network, and is formed of a wired local area network (LAN), a wireless LAN, or the like. The external apparatus 103 receives the captured image from the imaging apparatus 101 via the network 102 and displays the image, and transmits various kinds of request commands to the imaging apparatus 101.

Example of Configuration of Imaging Apparatus

Figure 2:
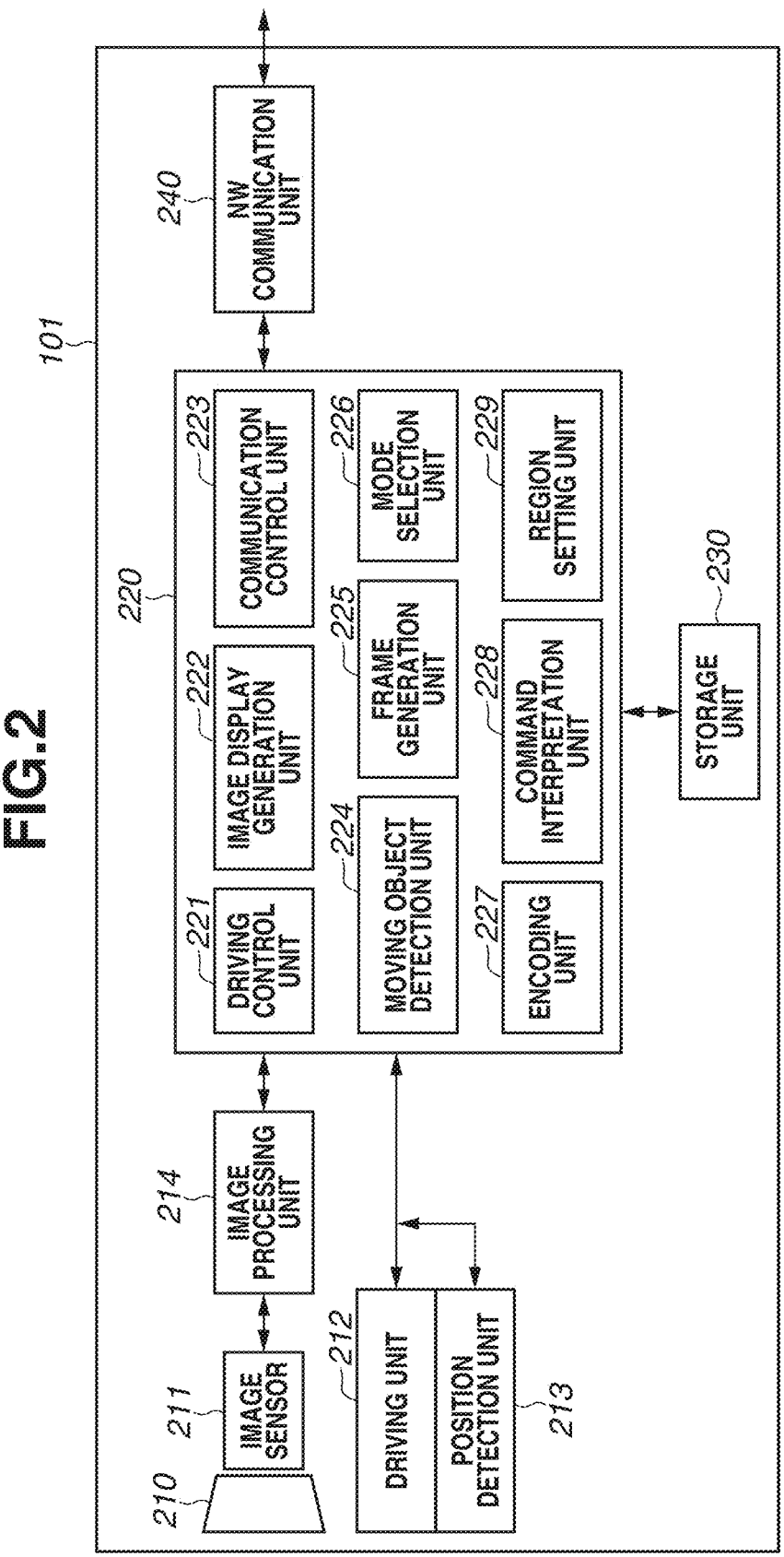
FIG. 2 is a block diagram illustrating an example of a configuration of an imaging apparatus.

Next, an example of the configuration of the imaging apparatus 101 will be described with reference to FIG. 2. The imaging apparatus 101 includes an imaging optical system 210, an image sensor 211, a driving unit 212, which drives not-illustrated driving systems (for example, various kinds of motors) that performs the pan operation, the tilt operation, and the zoom operation, a position detection unit 213, and an image processing unit 214. The imaging apparatus 101 further includes a control unit 220, which controls the driving unit 212, the position detection unit 213, the image processing unit 214, and the like, a storage unit 230, and a network (NW) communication unit 240, which is in charge of communication between the imaging apparatus 101 and the network 102.

The imaging optical system 210 includes a zoom lens, a focus lens, and a diaphragm mechanism, and collects light toward the image sensor 211. The image sensor 211 is formed of a two-dimensional image sensor such as a charge-coupled device (CCD) or a complementary metal-oxide semiconductor (CMOS), and photoelectrically converts the light collected on a light receiving surface and supplies an acquired electric signal to the image processing unit 214. The imaging optical system 210 and the image sensor 211 are examples of an imaging unit.

The driving unit 212 performs an operation of changing a pan direction, a tilt direction, and a zoom ratio of the imaging apparatus 101. More specifically, the driving unit 212 drives a driving system that moves an optical axis of the imaging apparatus 101 that captures an image in the pan direction and the tilt direction, and drives a driving system that moves the zoom lens of the imaging optical system 210 in the optical axis direction, based on a control signal provided from the control unit 220. The driving unit 212 may be configured in a different manner as long as it can perform an operation for changing at least one of the pan direction, the tilt direction, and the zoom ratio. The position detection unit 213 includes an encoder that detects a mechanical change in position made by the driving unit 212 using a sensor and outputs detected positional information, and supplies the acquired positional information to the control unit 220. The control unit 220 stores the positional information supplied from the position detection unit 213 in the storage unit 230.

The image processing unit 214 converts the electric signal supplied from the image sensor 211 into digital data, and performs various kinds of image processing such as demosaicing, processing for improving an image quality, and gain processing for enhancing an acquired light amount as a signal level. The image processing unit 214 supplies image data acquired by performing the various kinds of image processing to the control unit 220. Further, the image processing unit 214 performs processing of outputting a reset signal for clearing accumulated charges to the image sensor 211. Further, the image processing unit 214 also performs exposure control of adjusting the amount of light incident on the image sensor 211 by changing settings of the shutter speed, the aperture value, and the gain processing under control by the control unit 220.

The control unit 220 includes a driving control unit 221, an image display generation unit 222, a communication control unit 223, a moving object detection unit 224, a frame generation unit 225, a mode selection unit 226, an encoding unit 227, a command interpretation unit 228, and a region setting unit 229. The control unit 220 can include, for example, a central processing unit (CPU), a read only memory (ROM) storing a program that the CPU executes, and a random access memory (RAM) used as a work area of the CPU. The control unit 220 executes the program stored in the ROM, thereby functioning as each of the above-described constituent units (the reference numerals 221 to 227). However, some of these constituent units may be implemented by dedicated hardware. The control unit 220 is an example of a transmission unit, a detection unit, and a control unit.

The driving control unit 221 generates a control signal for controlling the pan operation, the tilt operation, and the zoom operation of the driving unit 212. The driving control unit 221 generates the control signal using amounts of changes in the pan direction, the tilt direction, and the zoom ratio specified by the command interpretation unit 228 while the imaging apparatus 101 is operating in a manual tracking mode, which will be described below. Further, the driving control unit 221 calculates angles in the pan direction and the tilt direction that allow a subject targeted for tracking to return to the center of the screen of a display device 307 of the external apparatus 103 as a return amount while the imaging apparatus 101 is operating in an automatic tracking mode, which will be described below. The return amount is calculated using positional information about the imaging apparatus 101 read from the storage unit 230, and positional information of a detection frame generated by the frame generation unit 225, which will be described below. The driving control unit 221 generates the control signal using the calculated return amount. The driving unit 212 drives the driving system based on the control signal generated by the driving control unit 221.

The image display generation unit 222 generates image information for displaying the image data supplied from the image processing unit 214 on the display device 307 of the external apparatus 103. The image display generation unit 222 generates the image information by cutting out a region from the image data or performing digital zoom processing for increasing or reducing the size of an image to be displayed in a desired size. The image display generation unit 222 provides the generated image information to the encoding unit 227.

The communication control unit 223 transmits encoded data generated by the encoding unit 227 to the external apparatus 103 via the NW communication unit 240. Further, when receiving various kinds of request commands from the external apparatus 103 via the NW communication unit 240, the communication control unit 223 provides these request commands to the command interpretation unit 228.

The moving object detection unit 224 detects a moving object from the image data supplied from the image processing unit 214 as the subject targeted for the tracking. The moving object detection unit 224, for example, compares previous image data and present image data for each frame interval, extracts a difference based on a result of the comparison, identifies a region in which a movement is made, and detects it as the moving object. The moving object detection unit 224 may detect the moving object from the image data by the background subtraction technique. For example, the moving object detection unit 224 may be configured to store image data captured in advance as a background image, and extract a region corresponding to a difference between the present image data and the background image as the region of the moving object. The processing for detecting the moving object from the image as the subject targeted for the tracking is performed in the present exemplary embodiment, but the processing for detecting the subject targeted for the tracking is not limited thereto. For example, human detection processing may be performed based on, for example, pattern matching using a human pattern as the method for detecting the subject targeted for the tracking from the image. Alternatively, processing of detecting a specific person may be used as the processing for detecting the subject targeted for the tracking from the image. In such a case, for example, the imaging apparatus 101 stores a feature amount of the face of the specific person in advance, and detects the face of the specific person from the image using the feature amount of the face of the specific person.

The frame generation unit 225 generates the detection frame that is superimposed on the moving object detected by the moving object detection unit 224. The detection frame is generated, for example, at a position and in size to surround the moving object.

The mode selection unit 226 selects one of the automatic tracking mode and the manual tracking mode as a tracking mode when the imaging apparatus 101 performs an operation of tracking the subject. The automatic tracking mode is a mode of controlling the pan operation, the tilt operation, and the zoom operation to automatically track the tracking target subject specified based on the moving object detected by the moving object detection unit 224. The automatic tracking mode is an example of a first mode. The manual tracking mode is a mode of manually tracking the tracking target subject by controlling the pan operation, the tilt operation, and the zoom operation according to an instruction input based on an operation from the external apparatus 103. The manual tracking mode is an example of a second mode. Further, the mode selection unit 226 selects whether to use an automatic tracking mode transition function that allows the imaging apparatus 101 to transition to the automatic tracking mode while the imaging apparatus 101 is operating in the manual tracking mode. The storage unit 230 stores the currently selected tracking mode and the setting about whether to use the automatic tracking mode transition function.

The encoding unit 227 encodes the image information acquired from the image display generation unit 222, thereby generating the encoded data. Then, the encoding unit 227 provides the encoded data to the communication control unit 223. The encoded data includes information for displaying the detection frame generated by the frame generation unit 225 on the display device 307 and information for displaying an automatic tracking transition frame corresponding to a specified region set by the region setting unit 229, which will be described below, on the display device 307.

The command interpretation unit 228 analyzes the request command provided from the communication control unit 223, and performs processing according the request command. In a case where an instruction for changing the imaging direction or the zoom ratio of the imaging apparatus 101 is issued by an operation on an operation unit 306 such as a mouse or a controller of the external apparatus 103, the command interpretation unit 228 analyzes the request command from the external apparatus 103. The command interpretation unit 228 provides the amounts of the changes in the pan direction, the tilt direction, and the zoom ratio acquired as a result of the analysis to the driving control unit 221.

The region setting unit 229 determines whether the moving object detected by the moving object detection unit 224 has entered the specified region (a predetermined region) in the captured image. In a case where the region setting unit 229 detects an entry and the manual tracking mode is currently selected, the region setting unit 229 instructs the mode selection unit 226 to switch the tracking mode from the manual tracking mode to the automatic tracking mode. Further, the region setting unit 229 sets coordinate information of the specified region.

The storage unit 230 allows data to be written into a specified address therein. The storage unit 230 is formed of a storage device that allows data to be read from a specified address (for example, a synchronous dynamic RAM (SDRAM)) and/or a storage device having a function of allowing data in a specified address to be read from nonvolatile data (for example, a flash ROM). The storage unit 230 stores the coordinate information of the specified region set by the region setting unit 229, and the positional information of the imaging apparatus 101 detected by the position detection unit 213. In the present exemplary embodiment, because data can be written into and read from the SDRAM at a high speed, the SDRAM stores a program that each constituent unit executes and data necessary for processing to be performed by the program, and is also used as a work area for executing various kinds of programs. A nonvolatile storage element such as the flash ROM is used as a permanent storage area of various kinds of programs and data. The storage unit 230 can also be implemented by using as an external device, and, for example, a hard disk, an optical disk, a magneto optical disk, a magnetic disk, or another solid-state memory may be used as the storage unit 230.

The network (NW) communication unit 240 is an interface for communicating with the network 102.

Example of Configuration of External Apparatus

Figure 3:
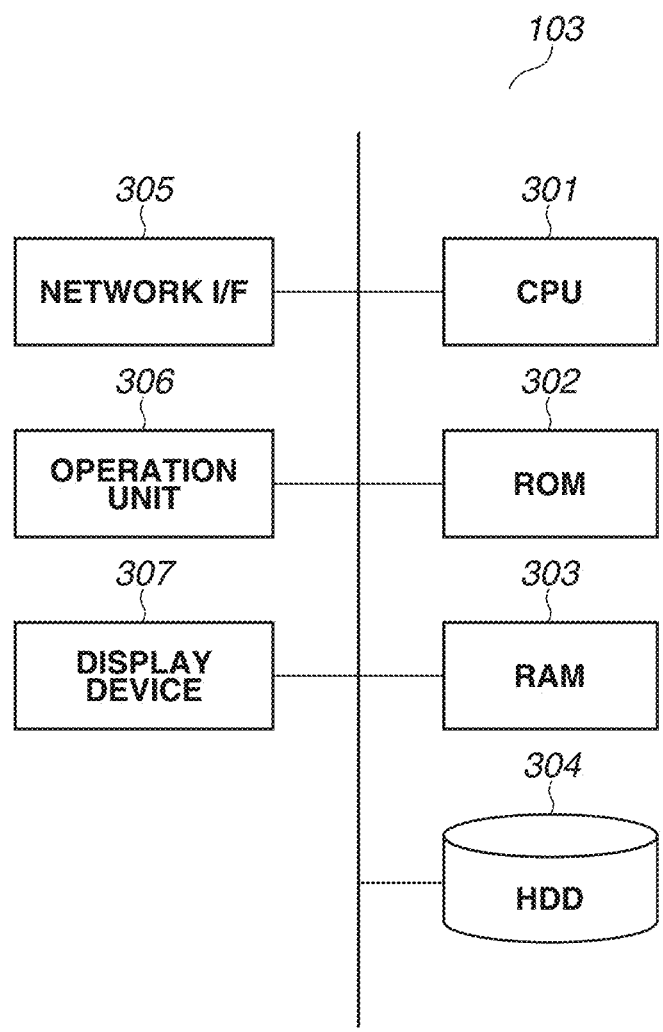
FIG. 3 is a block diagram illustrating an example of a configuration of an external apparatus.

Next, an example of the configuration of the external apparatus 103 will be described with reference to FIG. 3. The external apparatus 103 is formed of an information processing apparatus such as a personal computer (PC). The external apparatus 103 includes a CPU 301, which is in charge of control of the entire external apparatus 103, a ROM 302, which stores a basic input/output system (BIOS) and a boot program, and a RAM 303, which functions as a work area. Further, the external apparatus 103 includes a hard disk drive (HDD) 304, which stores an operating system (OS) and a camera application, and a network interface (I/F) 305, which is used for communicating with the network 102. Further, the external apparatus 103 includes the operation unit 306 for issuing an instruction directed to an operation of the imaging apparatus 101. The operation unit 306 includes a keyboard, a mouse, a joystick, a remote controller, a touch panel, and/or the like that receive an operation from the user. Further, the external apparatus 103 includes the display device 307.

In the above-described configuration, when the external apparatus 103 is powered on, the CPU 301 loads the OS from the HDD 304 into the RAM 303 and executes the OS based on the boot program stored in the ROM 302, thereby causing the external apparatus 103 to function as the information processing apparatus. As a result, the operation unit 306 and the display device 307 function as a user interface. Then, the user operates the operation unit 306 to instruct the external apparatus 103 to execute a camera application program, by which the camera application program is loaded from the HDD 304 into the RAM 303 and is executed, and the CPU 301 functions to control the display on the display device 307. The CPU 301 performs control to display the captured image, the detection frame, and the automatic tracking transition frame on the display device 307 based on the encoded data received from the imaging apparatus 101 via the network I/F 305. The CPU 301 is an example of a display control unit. In a case where an instruction for changing the imaging direction or the zoom ratio of the imaging apparatus 101 is issued by an operation on the operation unit 306, the CPU 301 generates the request command indicating the amount of change according to the instruction, and transmits the generated request command to the imaging apparatus 101 via the network I/F 305.

(Operation of Imaging Apparatus)

Figure 4:
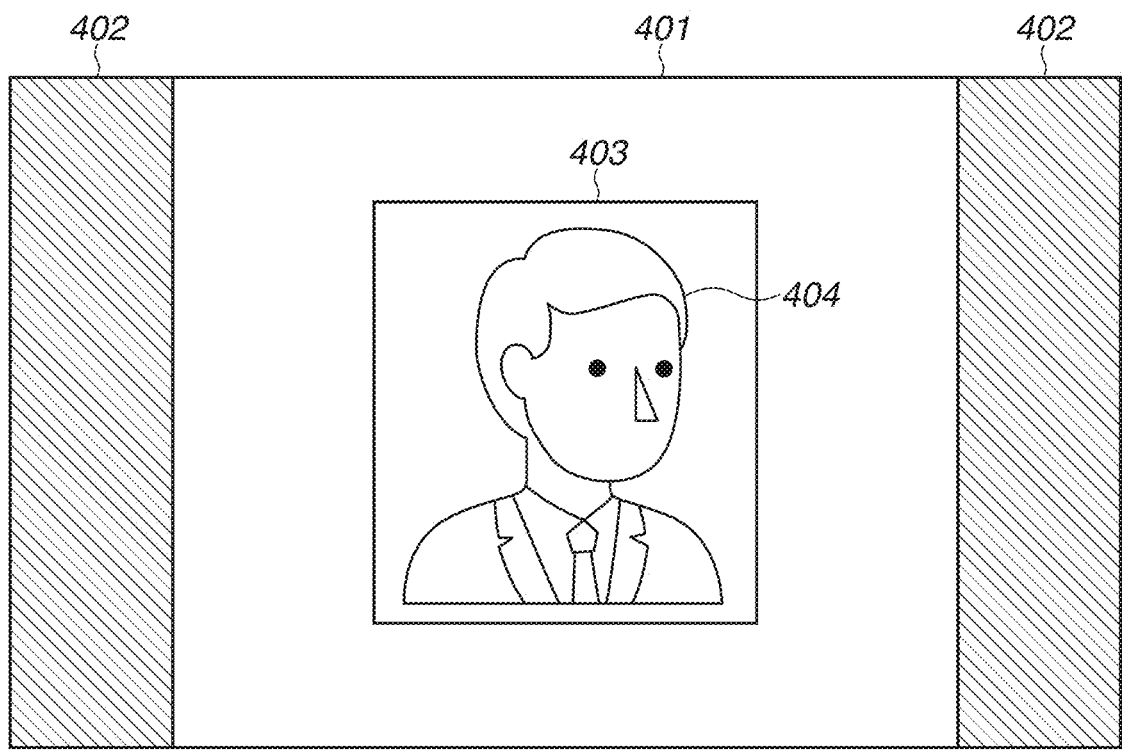
FIG. 4 illustrates an example of a screen according to a first exemplary embodiment.

Next, the operation of the imaging apparatus 101 according to the present exemplary embodiment will be described with reference to FIGS. 4 and 5. FIG. 4 illustrates a screen example of the display device 307 of the external apparatus 103, and FIG. 5 illustrates a flowchart. Tracking control processing for performing control to track the subject by changing the pan direction and the tilt direction of the imaging apparatus 101 will be described as processing performed by the imaging apparatus 101 according to the present exemplary embodiment.

The screen example illustrated in FIG. 4 indicates how a captured image currently being captured by the imaging apparatus 101 is displayed on the display device 307. A display screen 401 represents the entire screen of the display device 307, and an automatic tracking transition frame 402 is disposed on each of both of the left and right sides of the display screen 401. The automatic tracking transition frame 402 is a frame indicating the specified region set by the above-described region setting unit 229, and is specified using coordinate information on an X axis and a Y axis (an X-axis width and a Y-axis width) of the display screen 401. The automatic tracking transition frame 402 is provided on each of the both of the left and right sides of the display screen 401 in the present exemplary embodiment, but the position where the automatic tracking transition frame 402 is disposed is not limited in particular as long as the automatic tracking transition frame 402 is provided to include a coordinate of any of the upper, lower, left, and right ends of the display screen 401. A detection frame 403 is displayed while being superimposed on the captured image displayed on the display screen 401 in such a manner that the detection frame 403 surrounds a subject 404. The subject 404 is the moving object detected by the above-described moving object detection unit 224, and is specified as the tracking target.

When detecting that the detection frame 403 has entered the automatic tracking transition frame 402, the imaging apparatus 101 performs control to transition from the manual tracking mode to the automatic tracking mode of automatically tracking the subject 404 to keep the subject 404 within the display screen 401. The imaging apparatus 101 stores coordinate information of the automatic tracking transition frame 402 in the storage unit 230 in advance, and determines whether the detection frame 403 has entered the automatic tracking transition frame 402 when the moving object is detected. The detection frame 403 is determined as having entered the automatic tracking transition frame 402 if part of the detection frame 403 has entered the automatic tracking transition frame 402.

Next, details of the tracking control processing will be described with reference to the flowchart illustrated in FIG. 5. The tracking control processing is implemented by the control unit 220 of the imaging apparatus 101 executing the program stored in the ROM. The processing in the present flowchart is started when the imaging apparatus 101 starts transmitting the captured image to the external apparatus 103 and the captured image is displayed on the display device 307 of the external apparatus 103.

First, in step S501, the communication control unit 223 provides the request command received from the external apparatus 103 via the NW communication unit 240 to the command interpretation unit 228. When the command interpretation unit 228 provides a result acquired by interpreting the request command to the mode selection unit 226, the mode selection unit 226 selects whether to cause the imaging apparatus 101 to operate in the manual tracking mode or the automatic tracking mode. If the mode selection unit 226 selects the manual tracking mode (YES in step S501), the processing proceeds to step S502. If the mode selection unit 226 selects the automatic tracking mode (NO in step S501), the processing proceeds to step S510. The mode selection unit 226 may read the currently selected tracking mode from the storage unit 230 and select whether to cause the imaging apparatus 101 to operate in the manual tracking mode or the automatic tracking mode.

If the imaging apparatus 101 operates in the manual tracking mode (YES in step S501), in step S502, the mode selection unit 226 reads the setting about whether to use the automatic tracking mode transition function from the storage unit 230, and determines whether to use the automatic tracking mode transition function. If the mode selection unit 226 determines to use the automatic tracking mode transition function (YES in step S502), the processing proceeds to step S503. If the mode selection unit 226 determines not to use the automatic tracking mode transition function (NO in step S502), the processing proceeds to step S509.

If the imaging apparatus 101 uses the automatic tracking mode transition function (YES in step S502), in step S503, the moving object detection unit 224 detects a moving object or moving objects in the display screen 401, and the communication control unit 223 transmits an instruction to the external apparatus 103 to superimpose a detection frame or detection frames generated by the frame generation unit 225 on the detected moving object(s). Further, the moving object detection unit 224 specifies a specific detection frame among the superimposed detection frames as the tracking target. In this case, a detection frame specified by an operation on the operation unit 306 of the external apparatus 103 may be set as the tracking target. Alternatively, if the moving object detection unit 224 detects only one moving object, the detection frame superimposed on the moving object may be automatically set as the tracking target. In the case where the human detection processing using pattern matching or the like is performed as the processing for detecting the subject targeted for the tracking from the image, for example, the imaging apparatus 101 receives a user operation specifying a detection frame superimposed on a human being detected in the image, and sets the human being corresponding to the detection frame as the tracking target based thereon. Alternatively, the processing of detecting a specific person may be used as the processing for detecting the subject targeted for the tracking from the image. In this case, for example, the imaging apparatus 101 stores a feature amount of the face of the specific person in advance, and detect the face of the specific person from the image using the feature amount of the face of the specific person and set the detected specific person as the tracking target.

Next, in step S504, the region setting unit 229 reads the coordinate information of the automatic tracking transition frame 402 from the storage unit 230, and sets the automatic tracking transition frame 402. Subsequently, in step S505, the region setting unit 229 determines whether the detection frame of the tracking target has entered the automatic tracking transition frame 402 in such a situation that the subject is being continuously imaged while the driving control unit 221 performs the pan operation, the tilt operation, and the zoom operation in response to an operation from the external apparatus 103. If the region setting unit 229 determines that the detection frame of the tracking target has entered the automatic tracking transition frame 402 (YES in step S505), the processing proceeds to step S506. If the region setting unit 229 determines that the detection frame of the tracking target has not entered the automatic tracking transition frame 402 (NO in step S505), the processing proceeds to step S508.

If the detection frame of the tracking target is determined as having entered the automatic tracking transition frame 402 in step S505 (YES in step S505), in step S506, the mode selection unit 226 switches the tracking mode to the automatic tracking mode, and the driving control unit 221 controls the pan operation and the tilt operation in such a manner that the subject targeted for the tracking is displayed at the center of the display screen 401. Subsequently, in step S507, the mode selection unit 226 switches the tracking mode to the manual tracking mode again, and the manual tracking operation is restarted. In step S508, the manual tracking operation is continued with the tracking target specified. In step S509, the manual tracking operation is continued without the tracking target specified.

On the other hand, in step S510, the moving object detection unit 224 detects a moving object or moving objects in the display screen 401, and the communication control unit 223 transmits an instruction to the external apparatus 103 to superimpose a detection frame or detection frames generated by the frame generation unit 225 on the detected moving object(s). Then, the moving object detection unit 224 specifies a specific detection frame among the superimposed detection frames as the tracking target, and the driving control unit 221 controls the pan operation and the tilt operation so that the subject targeted for the tracking is displayed at the center of the display screen 401. While the automatic tracking operation performed in this manner is continued, in step S511, the mode selection unit 226 determines whether to switch the tracking mode to the manual tracking mode. In step S511, the mode selection unit 226 may function to switch the tracking mode in response to a selection operation from the operation unit 306 or may function to switch the tracking mode to the manual tracking mode if an instruction to change the pan direction or the tilt direction is issued from the operation unit 306. If the tracking mode is determined to be switched to the manual tracking mode in step S511 (YES in step S511), the processing proceeds to step S502. If the automatic tracking mode is determined to be continued (NO in step S511), the automatic tracking operation in step S510 is continued.

The imaging apparatus 101 according to the first exemplary embodiment configured in this manner prevents the intended subject from being excluded from the imaging target due to, for example, an excessive operation when tracking the subject by the operation from the external apparatus. In other words, the operability in the manual tracking can be improved.

Possible examples of a scene in which the imaging apparatus 101 according to the first exemplary embodiment is used include an imaging scene that images, for example, passing a baton in a relay race in track and field. In such an imaging scene, even if the image is captured in the automatic tracking mode before the baton is passed, it is desirable to instantaneously clear the automatic tracking mode and quickly switch the subject targeted for the tracking by the user's operation on the external apparatus 103 when the baton is passed. Thus, the present processing is configured in such a manner that, in step S511 illustrated in FIG. 5, the imaging apparatus 101 is instructed to change the tracking mode from the automatic tracking mode to the manual tracking mode by a simple operation from the operation unit 306 of the external apparatus 103. One example of the above-described simple operation is an operation of left-clicking and right-clicking performed simultaneously on the mouse as the operation unit 306. Another example is an operation of pressing a specific button of the controller as the operation unit 306. Alternatively, the imaging apparatus 101 may be instructed to change the tracking mode from the manual tracking mode to the automatic tracking mode when the controller is operated while the specific button is pressed.

The above-described first exemplary embodiment has been described regarding the automatic tracking mode transition function for preventing the intended subject from being excluded from the imaging target during the manual tracking operation, but a second exemplary embodiment will be described regarding a configuration that adjusts the setting of the automatic tracking transition frame depending on the imaging situation. The configuration of the imaging system 100 according to the second exemplary embodiment will be described while omitting the descriptions of portions similar to the configuration indicated in the first exemplary embodiment.

First, a method for adjusting the automatic tracking transition frame depending on the size of the subject targeted for the tracking will be described with reference to FIGS. 6A and 6B. Each of a display screen 601a illustrated in FIG. 6A and a display screen 601b illustrated in FIG. 6B indicates how the captured image currently being captured by the imaging apparatus 101 is displayed on the display device 307. Each of the display screens 601a and 601b represents the entire screen of the display device 307. Further, each of an automatic tracking transition frame 602a illustrated in FIG. 6A and an automatic tracking transition frame 602b illustrated in FIG. 6B corresponds to the automatic tracking transition frame 402 illustrated in FIG. 4, and each of a detection frame 603a illustrated in FIG. 6A and a detection frame 603b illustrated in FIG. 6B corresponds to the detection frame 403 illustrated in FIG. 4. Further, each of a subject 604a illustrated in FIG. 6A and a subject 604b illustrated in FIG. 6B corresponds to the subject 404 illustrated in FIG. 4. FIGS. 6A and 6B indicate that the size of the subject targeted for the tracking is different therebetween. In the examples illustrated in FIGS. 6A and 6B, the subject 604b on the screen has a size approximately three times as large as the subject 604a in terms of each of the X-axis width and the Y-axis width.

When the size of the subject targeted for the tracking is small as illustrated in FIG. 6A, it is considered that the user operating the operation unit 306 has an intention of seeking to grasp the situation surrounding the subject 604a and performing the tracking operation with such a zoom setting of imaging the subject in this size. Thus, the automatic tracking transition frame 602a is prevented from interfering with the user's operation by being set to a narrow width. For example, in a case where the width of the automatic tracking transition frame 402 illustrated in FIG. 4 is 100×1080 pixels in X and Y coordinates and the width is used as a reference setting, the width of the automatic tracking transition frame 602a illustrated in FIG. 6A is set to 50×1080 pixels, which is narrower than the reference setting.

On the other hand, in a case where the size of the subject targeted for the tracking is large as illustrated in FIG. 6B, it is considered that the user operating the operation unit 306 has an intention of seeking to capture the image while focusing on the subject 604b and is performing the tracking operation with such a zoom setting of imaging the subject in this size. When an enlargement setting is selected as the zoom setting in this manner, a slight movement of the imaging apparatus 101 causes a large movement of the position of the subject 604b on the display screen 601b, and this makes the user's operation difficult. Thus, when the size of the subject is large, the subject can be prevented from being lost from the display screen 601b due to the user's operation by setting the automatic tracking transition frame 602b to have a wide width as illustrated in FIG. 6B. For example, in the case where the width of the automatic tracking transition frame 402 illustrated in FIG. 4 is 100×

1080 pixels in X and Y coordinates and the width is used as the reference setting, the width of the automatic tracking transition frame 602b illustrated in FIG. 6B is set to 200×1080 pixels, which is wider than the reference setting. In the present exemplary embodiment, the automatic tracking transition frame is set to a small size when the size of the subject is small, and is set to a large size when the size of the subject is large, but the size of the automatic tracking transition frame is not limited thereto and may be selected based on a setting selected by the user.

In a case where the size of the automatic tracking transition frame is changed based on the size of the subject targeted for the tracking in the above-described manner, the storage unit 230 stores data indicating the corresponding relationship between the size of the subject and the size of the automatic tracking transition frame. In the above-described step S504 illustrated in FIG. 5, when the automatic tracking transition frame is set, the region setting unit 229 reads the above-described data indicating the corresponding relationship from the storage unit 230 and sets the automatic tracking transition frame to a size corresponding to the size of the subject targeted for the tracking in the present exemplary embodiment. The size of the subject is calculated when the moving object detection unit 224 detects the moving object.

Next, a method for adjusting the automatic tracking transition frame depending on a movement speed of the subject targeted for the tracking will be described with reference to FIGS. 7A and 7B. Each of a display screen 701a illustrated in FIG. 7A and a display screen 701b illustrated in FIG. 7B indicates how the captured image currently being captured by the imaging apparatus 101 is displayed on the display device 307. Each of the display screens 701a and 701b represents the entire screen of the display device 307. Further, each of an automatic tracking transition frame 702a illustrated in FIG. 7A and an automatic tracking transition frame 702b illustrated in FIG. 7B corresponds to the automatic tracking transition frame 402 illustrated in FIG. 4. Further, each of detection frames 703a and 705a illustrated in FIG. 7A and each of detection frames 703b and 705b illustrated in FIG. 7B corresponds to the detection frame 403 illustrated in FIG. 4. Further, each of subjects 704a and 706a illustrated in FIG. 7A and each of subjects 704b and 706b illustrated in FIG. 7B corresponds to the subject 404 illustrated in FIG. 4.

Figure 7B:
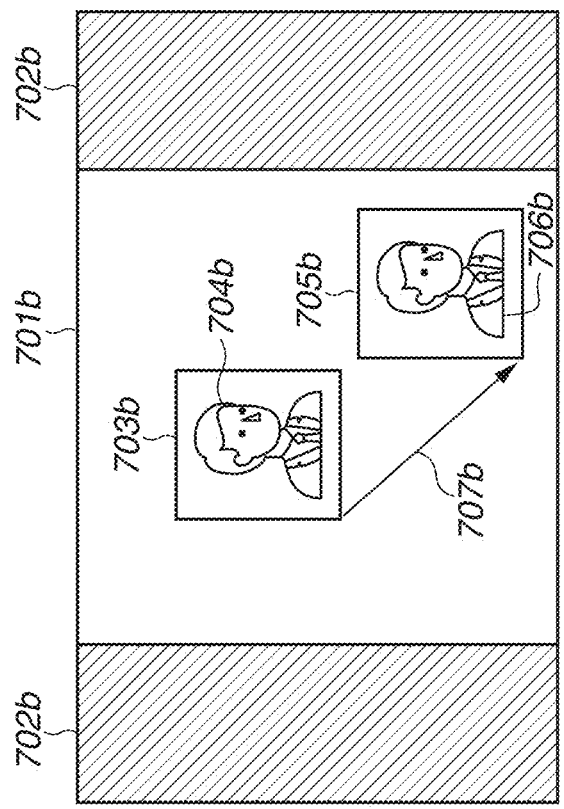
FIGS. 7A and 7B each illustrate an example of the screen according to the second exemplary embodiment.
Figure 7A:
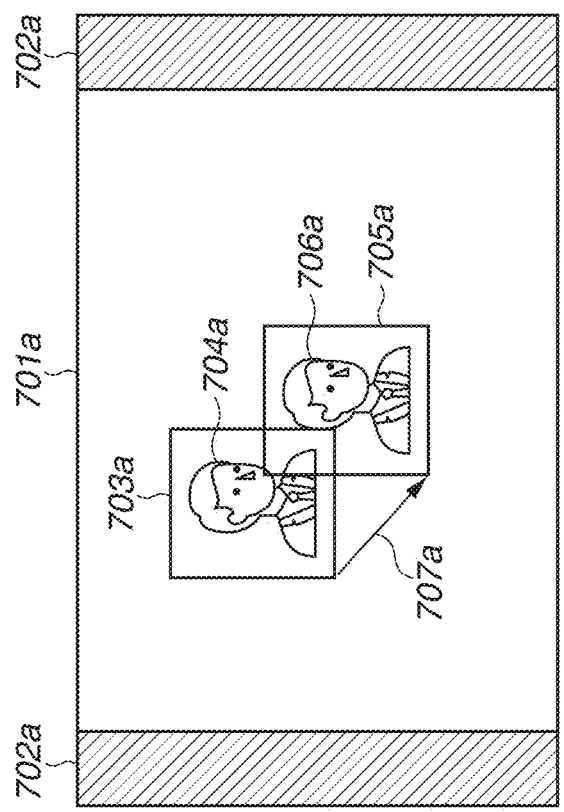

Each of an arrow 707a illustrated in FIG. 7A and an arrow 707b illustrated in FIG. 7B represents a movement amount of the subject from one frame to the next frame. FIG. 7A illustrates that the subject 704a moves to the subject 706a between the frames. FIG. 7B illustrates that the subject 704b moves to the subject 706b from one frame to the next frame. As illustrated in FIGS. 7A and 7B, the arrow 707b is longer than the arrow 707a, which makes it clear that the subject illustrated in FIG. 7B moves at a higher speed than that of the subject illustrated in FIG. 7A.

When the subject targeted for the tracking moves at a high speed as illustrated in FIG. 7B, the user's operation becomes difficult compared to when the subject targeted for the tracking moves at a low speed as illustrated in FIG. 7A. Thus, when the subject moves at a high speed, the subject can be prevented from being lost from the display screen 701b due to the user's operation by setting the automatic tracking transition frame 702b to a wide width as illustrated in FIG. 7B. For example, in a case where the length of the arrow 707b is approximately three times as long as the arrow 707a, when the automatic tracking transition frame 402 is 100×1080 pixels in X and Y coordinates and is used as the reference setting, the automatic tracking transition frame 702a illustrated in FIG. 7A is set to 50×1080 pixels, which is narrower than the reference setting. On the other hand, the automatic tracking transition frame 702b illustrated in FIG. 7B is set to 200×1080 pixels, which is wider than the reference setting. The automatic tracking transition frame is set to a small size when the subject moves at a low speed and is set to a large size when the subject moves at a high speed in the present exemplary embodiment, but the size of the automatic tracking transition frame is not limited thereto and may be selected depending on a setting selected by the user.

In a case where the size of the automatic tracking transition frame is changed based on the movement speed of the subject targeted for the tracking in the above-described manner, the storage unit 230 stores data indicating the corresponding relationship between the movement speed of the subject and the size of the automatic tracking transition frame. In the above-described step S504 illustrated in FIG. 5, when the automatic tracking transition frame is set, the region setting unit 229 reads the above-described data indicating the corresponding relationship from the storage unit 230 and sets the automatic tracking transition frame to a size corresponding to the movement speed of the subject targeted for the tracking in the present exemplary embodiment. The movement speed of the subject is calculated when the moving object detection unit 224 detects the moving object.

The imaging apparatus 101 according to the second exemplary embodiment configured in the above-described manner further prevents the intended subject from being excluded from the imaging target while working not to interfere with user's operability, by adjusting the automatic tracking transition frame depending on the size or the movement speed of the subject targeted for the tracking. In other words, the operability in the manual tracking can be improved.

The above-described second exemplary embodiment has been described regarding the configuration that adjusts the setting of the automatic tracking transition frame depending on the imaging situation, but a third exemplary embodiment will be described regarding a configuration that adjusts a return amount based on the direction of the operation on the operation unit 306 and the movement direction of the subject targeted for the tracking. The configuration of the imaging system 100 according to the third exemplary embodiment will be described while omitting the descriptions of portions similar to the configuration indicated in the first exemplary embodiment.

A method for adjusting the return amount will be described with reference to FIGS. 8A and 8B. Each of a display screen 801a illustrated in FIG. 8A and a display screen 801b illustrated in FIG. 8B displays the captured image currently being captured by the imaging apparatus 101. Each of the display screens 801a and 801b represents the entire screen of the display device 307. The automatic tracking transition frame 402 similar to FIG. 4 is provided on each of the display screens 801a and 801b. Each of a detection frame 803a illustrated in FIG. 8A and a detection frame 803b illustrated in FIG. 8B corresponds to the detection frame 403 illustrated in FIG. 4, and each of a subject 804a illustrated in FIG. 8A and a subject 804b illustrated in FIG. 8B corresponds to the subject 404 illustrated in FIG. 4.

FIG. 8A illustrates the display screen in a state where an entry in the automatic tracking transition frame 402 on the right side of the screen is detected when the subject 804a targeted for the tracking is moving in a direction indicated by an arrow 802a (rightward) in a state where an instruction for an rightward operation is issued from the external apparatus 103. In this case, the entry is detected on the right side of the screen despite the fact that the user is performing the rightward operation in an attempt to track the subject. Thus, it is inferred that the subject is moving at a speed higher than expected and the operation fails to keep up with the subject. Thus, as illustrated in FIG. 8B, the driving control unit 221 controls the movement in the pan direction to return the subject 804a in a direction indicated by an arrow 802b (leftward). FIG. 8B illustrates a state after the imaging apparatus 101 is moved in the pan direction from the state illustrated in FIG. 8A. In this case, the movement in the pan direction is controlled in such a manner that the subject 804b after the movement is returned to a position to the left of the center of the display screen 801b. The control in this manner can support the user's operation and prevent the subject from being lost from the display screen 801b. FIGS. 8A and 8B illustrate the example where the entry of the subject 804a in the automatic tracking transition frame 402 on the right side is detected when the user is performing the rightward operation. Conversely, if the entry of the subject in the automatic tracking transition frame 402 on the left side is detected when the user is performing a leftward operation, the driving control unit 221 controls the movement in the pan direction to move the subject rightward.

The control performed by the imaging apparatus 101 in a case where the return amount is adjusted based on the direction of the operation on the operation unit 306 and the movement direction of the subject targeted for the tracking will be described. First, if the region setting unit 229 determines that the subject targeted for the tracking has entered the specified region located in the movement direction, the region setting unit 229 instructs the mode selection unit 226 to switch the tracking mode from the manual tracking mode to the automatic tracking mode. After the mode selection unit 226 switches the tracking mode to the automatic tracking mode, the driving control unit 221 determines whether the direction of the operation includes the movement direction of the subject targeted for the tracking using the amount of change in the pan direction (the direction of the operation) designated by the command interpretation unit 228 and the movement direction of the subject targeted for the tracking. The movement direction of the subject can be calculated when the moving object detection unit 224 detects the moving object. If the direction of the operation is determined to include the movement direction of the subject targeted for the tracking, the driving control unit 221 calculates, as the return amount, an angle in the pan direction that causes the subject targeted for the tracking to return to a position shifted from the center of the display screen of the display device 307 of the external apparatus 103 in a direction opposite to the movement direction. The driving control unit 221 generates the control signal using the calculated return amount, and the driving unit 212 drives the driving system based on the control signal generated by the driving control unit 221.

The imaging apparatus 101 according to the third exemplary embodiment configured in this manner allows the operation to be supported when the operation fails to keep up with the subject despite the fact that the user is tracking the subject, by adjusting the return amount based on the direction of the operation on the operation unit 306 and the movement direction of the subject targeted for the tracking. This further prevents the intended subject from being excluded from the imaging target. In other words, the operability in the manual tracking can be improved.

The exemplary embodiments of the present disclosure have been described as the above, however, the above-described exemplary embodiments merely describe examples of how to embody the present disclosure when implementing the present disclosure, and the technical scope of the present disclosure shall not be construed limitedly by them. In other words, the present disclosure can be implemented in various manners without departing from the technical idea thereof or the main features thereof.

The present disclosure can also be realized by processing that supplies a program that implements one or more functions of the above-described exemplary embodiments to a system or an apparatus via a network or a storage medium, and causes one or more processors in a computer of the system or the apparatus to read and execute the program. Further, the present disclosure can also be implemented by a circuit (for example, an application specific integrated circuit (ASIC)) that implements one or more functions.

According to the above-described exemplary embodiments, it is possible to improve the operability when the intended subject is tracked by the operation from the external apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-107018, filed Jun. 22, 2020, which is hereby incorporated by reference herein in its entirety.

What is claimed is:

1. A control apparatus comprising a computer executing instructions that, when executed by the computer, cause the control apparatus to:

control, in a first mode, at least one of a pan, a tilt, and a zoom for an imaging unit in accordance with a user operation for operating the at least one of the pan, the tilt, and the zoom; wherein the first mode is a mode for controlling the at least one of the pan, the tilt, the zoom in accordance with the user operation, detect a moving object as a tracking target object in an image captured by the imaging unit;

determine, on a basis of a position of the tracking target object detected from the image, whether the tracking target object within the image captured by the imaging unit has moved and entered a predetermined partial region from outside of the predetermined partial region within the image; wherein the predetermined partial region is a part of the image, and the predetermined partial region at least includes a coordinate of any of the upper, lower, left, and right ends of the image, and in a case where it is determined that the tracking target object has entered the predetermined partial region in the first mode, automatically start controlling, without the user operation, at least one of the pan, the tilt, and the zoom for the imaging unit in accordance with a position of the tracking target object detected from the image captured by the imaging unit, so that a distance between the tracking target object and a center of the image captured by the imaging unit decreases.

2. The control apparatus according to claim 1, wherein the instructions cause the control apparatus to control the pan and/or the tilt in accordance with the position of the tracking target detected from the image captured by the imaging unit so that the tracking target object is located at a center of the image, after it is determined that the tracking target object has entered the predetermined partial region within the image while the at least one of the pan, the tilt, the zoom is controlled in accordance with the user operation.

3. The control apparatus according to claim 2, wherein a first mode is a mode for controlling the at least one of the pan, the tilt, the zoom in accordance with the position of the tracking target detected from the image captured by the imaging unit, and a second mode is a mode for controlling the at least one of the pan, the tilt, the zoom in accordance with the user operation, and wherein the instructions cause the control apparatus to switch the first mode back to the second mode after controlling the pan and/or the tilt causing the tracking target object to be located at the center of the image.

4. The control apparatus according to claim 1, wherein the instructions cause the control apparatus to control the pan and/or the tilt so that the tracking target object is located at a position shifted from a center of the image in a direction opposite to a movement direction of the tracking target object, in a case where (a) the tracking target object is located in the predetermined partial region within the image while the at least one of the pan, the tilt, the zoom is controlled in accordance with the user operation and (b) a direction by the user operation corresponds to the movement direction of the tracking target object.

5. The control apparatus according to claim 1, wherein a size of the predetermined partial region is set based on a size of the tracking target object and a reference setting.

6. The control apparatus according to claim 1, wherein a size of the predetermined partial region is set based on a movement speed of the tracking target object and a reference setting.

7. The control apparatus according to claim 1, wherein the instructions cause the control apparatus to perform the detection process for detecting the tracking target object.

8. A method for controlling an imaging apparatus, the method comprising:

controlling, in a first mode, at least one of a pan, a tilt, and a zoom for an imaging unit in accordance with a user operation for operating the at least one of the pan, the tilt, and the zoom; wherein the first mode is a mode for controlling the at least one of the pan, the tilt, the zoom in accordance with the user operation, detecting a moving object as a tracking target object in an image captured by the imaging unit;

determining, on a basis of a position of the tracking target object detected from the image, whether the tracking target object within the image captured by the imaging unit has moved and entered a predetermined partial region within the image; wherein the predetermined partial region is a part of the image, and the predetermined partial region at least includes a coordinate of any of the upper, lower, left, and right ends of the image, and in a case where it is determined that the tracking target object has entered the predetermined partial region in the first mode, automatically starting controlling, without the user operation, at least one of the pan, the tilt, and the zoom for the imaging unit in accordance with a position of the tracking target detected from the image captured by the imaging unit, so that a distance between the tracking target object and a center of the image captured by the imaging unit decreases.

9. The method according to claim 8, further comprising:

controlling the pan and/or the tilt so that the tracking target object is located at a center of the image, in a case where it is determined that the tracking target object has entered the predetermined partial region within the image while the at least one of the pan, the tilt, the zoom is controlled in accordance with the user operation.

10. The method according to claim 9, wherein a first mode is a mode for controlling the at least one of the pan, the tilt, the zoom in accordance with the position of the tracking target detected from the image captured by the imaging unit, and a second mode is a mode for controlling the at least one of the pan, the tilt, the zoom in accordance with the user operation, and wherein the method further comprises switching the first mode back to the second mode after controlling the pan and/or the tilt causing the tracking target object to be located at the center of the image.

11. The method according to claim 8, further comprising:

controlling the pan and/or the tilt so that the tracking target object is located at a position shifted from a center of the image in a direction opposite to a movement direction of the tracking target object, in a case where (a) the tracking target object is included in the predetermined partial region within the image while the at least one of the pan, the tilt, the zoom is controlled in accordance with the user operation and (b) a direction by the user operation corresponds to the movement direction of the tracking target object.

12. The method according to claim 8, wherein the predetermined partial region is a part of a whole region in the image, the predetermined partial region at least includes a coordinate of any of the upper, lower, left, and right ends of the image.

13. The method according to claim 8, wherein a size of the predetermined partial region is set based on a size of the tracking target object and a reference setting.

14. The method according to claim 8, wherein a size of the predetermined partial region is set based on a movement speed of the tracking target object and a reference setting.

15. The method according to claim 8, further comprising:
performing the detection process for detecting the tracking target object.

16. A non-transitory computer readable storage medium storing instructions that, when executed by one or more processors, execute a method for controlling an imaging apparatus, the method comprising:
controlling, in a first mode, at least one of a pan, a tilt, and a zoom for an imaging unit in accordance with a user operation for operating the at least one of the pan, the tilt, and the zoom; wherein the first mode is a mode for controlling the at least one of the pan, the tilt, the zoom in accordance with the user operation;
detecting a moving object as a tracking target object in an image captured by the imaging unit;
determining, on a basis of a position of the tracking target object detected from the image, whether the tracking target object within the image captured by the imaging unit has moved and entered a predetermined partial region from outside of the predetermined partial region within the image; wherein the predetermined partial region is a part of the image, and the predetermined partial region at least includes a coordinate of any of the upper, lower, left, and right ends of the image; and
in a case where it is determined that the tracking target object has entered the predetermined partial region in the first mode, automatically starting controlling, without the user operation, at least one of the pan, the tilt, and the zoom for the imaging unit in accordance with a position of the tracking target detected from the image captured by the imaging unit, so that a distance between the tracking target object and a center of the image captured by the imaging unit decreases.

* * * * *